United States Patent
Lane et al.

(10) Patent No.: US 9,486,771 B2
(45) Date of Patent: Nov. 8, 2016

(54) ELECTROCHEMICAL CARBON MONOXIDE PRODUCTION

(71) Applicants: Jonathan Andrew Lane, Amherst, NY (US); Gervase Maxwell Christie, Amherst, NY (US); Dante Patrick Bonaquist, Boalsburg, PA (US)

(72) Inventors: Jonathan Andrew Lane, Amherst, NY (US); Gervase Maxwell Christie, Amherst, NY (US); Dante Patrick Bonaquist, Boalsburg, PA (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 94 days.

(21) Appl. No.: 14/053,177

(22) Filed: Oct. 14, 2013

(65) Prior Publication Data
US 2014/0044604 A1    Feb. 13, 2014

Related U.S. Application Data

(62) Division of application No. 12/961,987, filed on Dec. 7, 2010, now Pat. No. 8,591,718.

(60) Provisional application No. 61/325,557, filed on Apr. 19, 2010.

(51) Int. Cl.
*C25B 1/00*    (2006.01)
*B01J 19/08*   (2006.01)
*B01D 53/32*   (2006.01)

(52) U.S. Cl.
CPC ............ *B01J 19/087* (2013.01); *B01D 53/326* (2013.01); *C25B 1/00* (2013.01); *B01D 2256/20* (2013.01); *B01D 2257/504* (2013.01); *Y02E 60/364* (2013.01); *Y02P 20/152* (2015.11)

(58) Field of Classification Search
CPC ............... B01J 19/087; B01D 53/326; B01D 2256/20; B01D 2257/504; C25B 1/00; Y02P 20/152; Y02E 60/364
See application file for complete search history.

(56) References Cited

U.S. PATENT DOCUMENTS 6,010,614 A * 1/2000 Keskar et al. ................ 205/765
6,051,125 A * 4/2000 Pham et al. .................. 205/637
(Continued)

FOREIGN PATENT DOCUMENTS

WO    WO 00/17418    3/2000

OTHER PUBLICATIONS

Ebbesen, S.D. et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: DOI: 10.1016/J. JPOWSOUR. 2009. 02. 093.
(Continued)

*Primary Examiner* — Ciel Thomas
(74) *Attorney, Agent, or Firm* — Ralph J. Mancini

(57) ABSTRACT

A method and apparatus for producing a carbon monoxide containing product in which cathode and anode sides of an electrically driven oxygen separation device are contacted with carbon dioxide and a reducing agent, respectively. The carbon dioxide is reduced to carbon monoxide through ionization of oxygen and the reducing agent lowers the partial pressure of oxygen at the anode side to partially drive oxygen ion transport within the device through the consumption of the oxygen and to supply heat. The lowering of oxygen partial pressure reduces voltage and therefore, electrical power required to be applied to the device and the heat is supplied to heat the device to an operational temperature and to the reduction of the carbon dioxide occurring at the cathode side. The device can be used as part of an integrated apparatus in which the carbon dioxide is supplied from a waste stream of a process plant.

5 Claims, 2 Drawing Sheets

(56) References Cited

U.S. PATENT DOCUMENTS

| | | | |
|---|---|---|---|
| 2008/0023338 A1* | 1/2008 | Stoots et al. | 205/637 |
| 2010/0074828 A1* | 3/2010 | Singh | 423/432 |
| 2010/0200418 A1* | 8/2010 | Licht | 205/340 |

OTHER PUBLICATIONS

F. Bidrawn, G. Kim, J. T. S. Irvine, J.M. Vohs, R.J. Gorte, "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

* cited by examiner

US 9,486,771 B2

ELECTROCHEMICAL CARBON MONOXIDE PRODUCTION

RELATED APPLICATIONS

This application is a divisional application of prior U.S. application Ser. No. 12/961,987, filed Dec. 7, 2010, now allowed, which claims priority to U.S. Provisional Application Ser. No. 61/325,557, filed on Apr. 19, 2010, the entire contents of which is incorporated herein by reference in its entirety.

FIELD OF THE INVENTION

The present invention relates to a method and apparatus for producing a carbon monoxide containing product by contacting an electrically driven oxygen separation device with a carbon dioxide containing feed to reduce the carbon dioxide to carbon monoxide. More particularly, the present invention relates to such a method and apparatus in which a hydrocarbon containing feed is contacted on the anode side of the separation device to reduce the partial pressure of oxygen at the anode side and thus, help drive oxygen ion transport and to heat the device to an operational temperature at which oxygen ion transport can occur and to supply endothermic heating requirements to drive the carbon dioxide reduction.

BACKGROUND OF THE INVENTION

There are many known industrial processes that require the use of carbon monoxide principally in the production of chemicals including the manufacture of aldehydes, methanol, phosgene and acetic acid via the MONSANTO process. Carbon monoxide is also hydrogenated to liquid hydrocarbon fuels in the Fischer-Tropsch process. A common manner of producing such carbon monoxide is through steam methane reforming and the separation of carbon monoxide from resulting synthesis gases in connection with the production of hydrogen.

Hydrogen has also been produced by natural gas assisted steam electrolyzers in which steam is contacted at the cathode side of an electrically driven oxygen separation devices to produce hydrogen from the disassociation of water that is assisted by combustion of natural gas at anode side of the separation device. An example of such a device is shown in U.S. Pat. No. 6,051,125. It is to be noted that such devices are similar to fuel cells save the fact that instead of generating electricity, a voltage is applied to drive the oxygen ion transport.

Typically, such electrically driven oxygen separation devices have a membrane element that incorporates an electrolyte layer to conduct oxygen ions that is located between two electrode layers to apply an electrical potential across the electrolyte. The electrode layers are porous and can have sublayers while the electrolyte is an air-tight, dense layer. The resulting composite structure can be in the form of a tube in which the oxygen containing feed is fed to the inside of the tube and the separated oxygen is either collected on the outside of the tube and then dissipated. The reverse is possible and oxygen can be fed to the outside of the tube and the permeated oxygen collected on the inside of the tube. Other forms are possible, for example, flat plates and honeycomb-like structures.

The electrolyte layer is formed of an ionic conductor that is capable of conducting oxygen ions when subjected to an elevated operational temperature and an electrical potential applied to the electrode layers. Under such circumstances, the oxygen ions will ionize on one surface of the electrolyte layer known as the cathode side and under the impetus of the electrical potential will be transported through the electrolyte layer to the opposite cathode side where the oxygen ions will recombine into molecular oxygen. Typical materials that are used to form the electrolyte layer are yttria stabilized zirconia and gadolinium doped ceria. The electrical potential is applied to the electrolyte by way of cathode and anode electrodes. The oxygen ionizes at the cathode and the oxygen ions recombine at the anode. Typically, electrodes can be made of mixtures of the electrolyte material and a conductive metal, metal alloy or an electrically conductive perovskite. In order to distribute current to the electrodes, current collectors are utilized in the form of layers on the electrodes opposite to the electrolyte.

As will be discussed, the present invention provides a method of generating carbon monoxide from a carbon dioxide containing feed with the use of an electrically driven oxygen separation device.

SUMMARY OF THE INVENTION

The present invention provides a method of producing a carbon monoxide containing product. In accordance with such method, a cathode side of an electrically driven oxygen separation device is contacted with a carbon dioxide containing feed stream. The carbon dioxide is reduced to the carbon monoxide through ionization of oxygen at the cathode side and transport of the oxygen ions to an anode side of the electrically driven oxygen separation device. The anode side of the electrically driven oxygen separation device is contacted with a reducing agent stream containing a reducing agent to lower partial pressure of oxygen at the anode side of the electrically driven oxygen separation device and thereby to partially drive the oxygen ion transport through the consumption of the oxygen and reduce voltage and therefore, electrical power required to be applied to the device and to supply heat to the device for purposes of heating the device to an operational temperature at which oxygen ion transport can occur and to the reduction of the carbon dioxide occurring at the cathode side. A product stream comprising the carbon monoxide is withdrawn from the cathode side. In this regard, the carbon monoxide product stream could be pure or the carbon dioxide containing feed stream could also contain water such that the product stream is a synthesis gas stream.

The reducing agent stream can be a hydrocarbon containing stream that combusts at the anode side. The carbon dioxide containing feed can have a purity of at least about 80 percent by volume of carbon dioxide on a dry basis. In such case, the carbon dioxide containing feed stream can be formed from a waste stream of a process. The process can be, for example, processes involved in natural gas processing, the production of mineral products such as cement, lime and soda ash, the production of metals such as iron and steel, aluminum, zinc and lead, production of glass where oxyfuel combustion is used and the production of chemicals such as ethanol, ammonia, ethylene oxide and titanium dioxide. The waste stream can be further processed by removing water and other impurities from the waste stream to produce the carbon dioxide containing feed. The hydrocarbon containing stream can be methane such that combustion products are produced that contain additional carbon dioxide and water. A combustion product stream is extracted from the anode side, water is separated from the combustion product stream and the combustion product stream is recycled back to the cathode side of the electrically driven oxygen separation device.

Generally speaking, the reducing agent stream and the carbon dioxide containing feed stream are preferably preheated through indirect heat exchange with at least part of the product stream and at least part of a reacted stream produced by contacting the anode side with the reducing agent stream and withdrawn from the anode side. Where a hydrocarbon containing feed stream is used, such feed stream and the carbon dioxide containing feed stream are preheated through indirect heat exchange with at least part of the product stream and at least part of the combustion product stream. In any method or apparatus of the present invention, part of the product stream can be recycled back to the cathode side for such material compatibility purposes as described below and part of the reacted stream or the combustion product stream can also be recycled back to the anode side in order to introduce steam to the anode and prevent carbon deposition.

The method can further include generating a synthesis gas in a blast furnace and using the synthesis gas as the reactant within the reactant stream.

In another aspect, the present invention provides an integrated apparatus for producing a carbon monoxide containing product that comprises a process plant, a heat exchanger, a power supply and an electrically driven oxygen separation device.

The process plant generates a waste stream containing carbon dioxide, water and other impurities. The heat exchanger is in flow communication with the process plant and is configured to preheat a carbon dioxide containing stream formed from the waste stream and a reducing agent stream containing a reducing agent through indirect heat exchange with a reacted stream and a carbon monoxide containing product stream. The power supply is configured to generate an electrical potential and the electrically driven oxygen separation device has a cathode side and an anode side connected to the power supply such that the electrical potential is applied to the cathode side and the anode side.

The cathode side is connected to the heat exchanger such that the cathode side is contacted with a carbon dioxide containing feed stream, thereby to reduce the carbon dioxide to the carbon monoxide through ionization of oxygen at the cathode side and transport of the oxygen ions to an anode side of the electrically driven oxygen separation device and to return the carbon monoxide product stream to the heat exchanger. The anode side is connected to the heat exchanger such that the anode side is contacted with the reducing agent stream and the reacted stream is returned to the heat exchanger such that the partial pressure of oxygen is lowered at the anode side and the oxygen ion transport is driven in part through the consumption of the oxygen, the electrical potential and therefore, electrical power required to be applied to the electrochemical oxygen separation device is reduced and heat is supplied to the electrochemical oxygen separation device for purposes of heating the electrochemical oxygen separation device to an operational temperature at which oxygen ion transport can occur and to the reduction of the carbon dioxide occurring at the cathode side.

The carbon dioxide containing feed stream can also contain water such that the product stream is a synthesis gas stream. Alternatively, the carbon dioxide containing feed stream can be produced from the waste stream by provision of a drying system positioned between the carbon dioxide producing plant and the heat exchanger. The drying system is configured to condense the water in the waste stream and separate the water after having been condensed, thereby to produce a carbon dioxide containing feed stream containing about 80.0 percent carbon dioxide on a dry basis.

The reducing agent can be methane so that the reacted stream contains additional water and additional carbon dioxide. The additional water and additional carbon dioxide are separated in the drying system or an additional drying system and the additional carbon dioxide is recycled back to the cathode side of the electrically driven oxygen separation device. The process plant can be selected from the group of plants designed to expel carbon dioxide comprising natural gas processing, the production of mineral products such as cement, lime and soda ash, the production of metals such as iron and steel, aluminum, zinc and lead, production of glass where oxyfuel combustion is used and the production of chemicals such as ethanol, ammonia, ethylene oxide and titanium dioxide.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
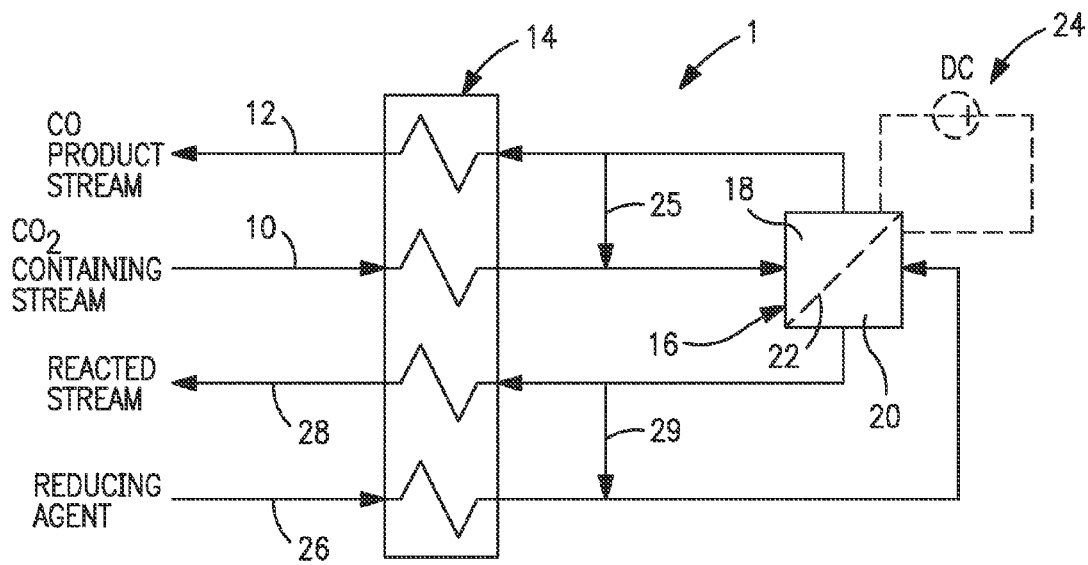
FIG. 1 is a schematic illustration of an apparatus for carrying out a method in accordance with the present invention.

With reference to FIG. 1, an apparatus 1 is illustrated for carrying out a method to generate a carbon monoxide containing product stream 12 from a carbon dioxide containing feed stream 10. The carbon dioxide contained in the carbon dioxide containing feed stream 10 can be of high purity, above 99 percent carbon dioxide by volume or diluted with other substances. It is to be noted that where such substances contain oxygen, the carbon monoxide will not only contain such substances, but also, other substances that were molecularly combined with the oxygen. For example, if water is present, then hydrogen would be present within the carbon monoxide containing product stream 12 as a result of disassociation of the water molecules at the cathode side 18 of the electrically driven oxygen separation device 16 described below. Here, the water would be controlled to produce a specific hydrogen to carbon monoxide ratio in the product which would be a synthesis gas.

The carbon dioxide containing feed stream 12 is introduced into a heat exchanger 14 to preheat the carbon dioxide containing feed stream before introduction into an electrically driven oxygen separation device 16 having a cathode side 18 and an anode side 20 separated by a membrane element 22. An electrical potential is applied to the cathode side 18 and the anode side 20 by an electrical power source 24. Electrically driven oxygen separation device 18 has a structure containing one or more membrane elements 22 such as described above and although no particular form of the device is preferred, it can have the form of a solid oxide fuel cell, many examples of which exist in the prior art. As such it is to be noted that the term "cathode side" as used herein and in the claims means the side of one or all of such membrane elements in which the carbon dioxide is introduced and reduced into carbon monoxide and the term "anode side" means the side of one or all of such elements in which the reducing agent, for example methane is introduced for purposes to be discussed. The membrane element 22 or collection of elements is formed with an electrolyte layer sandwiched between a cathode electrode at the cathode side 18 and an anode electrode at the anode side 20. Both of such electrodes are covered with a current collector that is physically connected to the electrical power source 24.

It is to be noted, that optionally, a part 25 of the carbon monoxide containing product stream 12 can be recycled back to the cathode side 18. This would be done where the cathode electrode material is not compatible with the carbon dioxide that may act as an oxidizing agent. For example, if the cathode electrode were made of a Ni/YSZ cermet, the nickel would tend to oxidize in the carbon dioxide containing atmosphere. The recycle of the carbon monoxide will dilute the carbon dioxide to prevent the oxidation. The foregoing recycling can be conducted in any embodiment of the invention including those embodiments shown in FIGS. 2 and 3 below.

The anode side 20 is also connected to the heat exchanger 14 so that a reducing agent stream 26 is introduced to the anode side 20 and is reacted so as to produce a reacted stream 28 that is in a heated state. In this regard, the carbon monoxide product stream 12 will also be in a heated state and such streams serve to preheat the carbon dioxide containing feed stream 10 and the reducing agent stream 26. The reducing agent stream 26 can be a hydrocarbon containing steam, for example, natural gas or perhaps a low quality syngas produced by a blast furnace that would contain both hydrogen and carbon monoxide. The present invention in such case would be used in effect, to process such stream and convert the low quality and purity carbon monoxide into a high purity carbon monoxide product. This particular aspect of the present invention is intended to be covered in any claim setting forth the scope of the present invention. The reducing agent stream 26 can also be methane. In order to prevent carbon deposition in case of the use of a hydrocarbon as a reducing agent, a part 29 of the reacted stream 28 which would be a combustion product stream, optionally could be recycled to the reducing agent stream 26 to recycle the steam contained therein as a result of the reaction. Consequently, if recycling of the carbon monoxide containing product stream 12 and/or the reacted stream 28 is required, then only part of the carbon monoxide containing product stream 12 and/or part of the reacted stream 28 would be available for preheating purposes. Additionally, such recycling could be performed in connection with any embodiment of the present invention including the embodiments illustrated in FIGS. 2 and 3 below.

The reducing agent stream 26 reacts at the anode side 20 by consumption of oxygen to produce heat that heats the membrane element(s) to an operational temperature, for instance 800° C. to 850° C. and further to supply heat to the endothermic reaction of the reduction of carbon dioxide to carbon monoxide. Since oxygen is being consumed at the anode side 20, the oxygen partial pressure is lowered to help drive the oxygen ion transport through the membrane element(s) 22 and decrease the amount of electrical potential and therefore power that is required to be applied by electrical power source 24.

More specifically, the reduction of carbon dioxide to carbon monoxide and oxygen is described by the following equation:

$$CO_2 + 282.3 \text{ kJ/mol} \rightarrow CO + \frac{1}{2}O_2).$$

This reaction is endothermic and so at a typical operating temperature for the electrically driven oxygen separation unit 16 of 800-850° C. then the reaction enthalpy, $\Delta H=282.3$ kJ needs to be provided per mole carbon dioxide for the reaction to proceed.

Assuming that reducing agent stream 26 were not used, at steady state operation the oxygen partial pressure on the cathode side 18 of the electrolyte is much lower than the anode side and it therefore generates a voltage. $V_{Nernst}$, given by the following equation $$V_{Nernst} = \frac{RT}{4F} \ln \frac{pO_2''}{pO_2'} \approx 1 \text{ V};$$

where R is the gas constant, T is the temperature, F is Faraday's constant. This means that at least 1 V needs to be applied to the cell for the reaction to proceed in the direction of reduction of carbon dioxide to carbon monoxide and oxygen. One important operating condition is the "thermoneutral voltage", which is the voltage at which all the heat energy required to drive the reduction reaction is provided by the resistive Joule heating of electrically driven oxygen separation device 16 and is 1.46 V for the reduction of $CO_2$ to CO at 850° C. Assuming further that thermal energy were recouped in a heat exchanger, such as heat exchanger 14, from the product stream, such as product stream 12 and in an oxygen containing stream (since reducing agent stream 26 is not used) in the carbon dioxide containing feed stream. such as designed herein by reference number 10, the thermoneutral voltage will be ~1.55 V, given that the heat exchange is not 100 percent efficient. In the illustrated embodiments of the present invention, however, no attempt is made to collect pure oxygen from the anode side 20 of the electrically driven oxygen separation device 16 and, instead, a reducing agent stream such as methane or natural gas is supplied to the anode side 20 where it combusts with the oxygen transported through the electrolyte of the membrane element(s) 22. This means that the oxygen partial pressure on either side of the electrolyte is similar so the cell Nernst voltage is small and the electrochemical reduction of carbon dioxide can be driven by a much reduced voltage. Combustion of the methane or natural gas in the anode compartment provides the majority of the thermal energy required to drive the endothermic carbon dioxide reduction reaction and the remainder is supplied through Joule heating by operating the electrically driven oxygen separation device 16 at 0.51V. The table below demonstrates that this process is a significant net consumer of $CO_2$ with only 0.633 ton emitted from electricity generation and methane combustion for every ton consumed in the reduction process. The overall net reaction for the process is given by the following equation:

$3CO_2+CH_4+$electrical energy(99 kJ/mol $CO_2)\rightarrow 4CO+2H_2O$

TABLE

Figure 2:
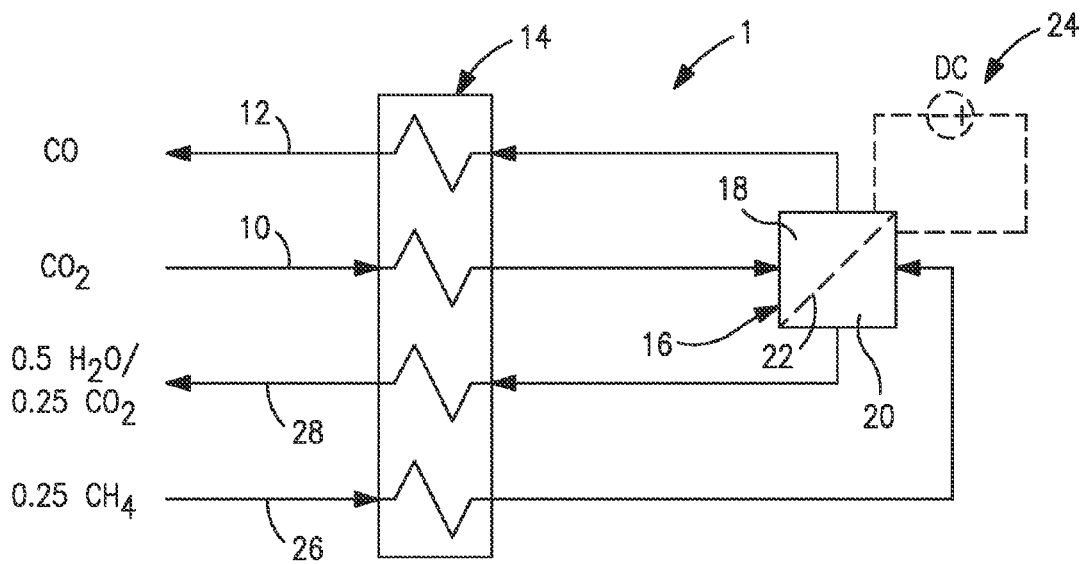
FIG. 2 is a schematic illustration of the apparatus of shown in FIG. 1 where methane is used as a hydrocarbon containing stream fed to the anode side of an electrically driven oxygen separation device.

Energy & CO₂ balances for Process Configuration of FIG. 2

| | Component | Value |
|---|---|---|
| Energy balance | CO₂ reduction | −1781.8 kWh |
| | Increase gas temperature from 800 to 850° C. | −17.7 kWh |
| | Thermal losses | −88.4 kWh |
| | Electrical energy input | 624 kWh |
| | Thermal energy from natural gas combustion | 1263.9 kWh |
| CO₂ emissions | CO₂ consumed | 2204.6 lb |
| | CO₂ emitted from electricity generation | 836.8 lb |
| | CO₂ emitted from combustion of natural gas | 558.9 lb |
| | Net CO₂ emitted | −808.9 lb |

With reference to FIG. 2, the carbon dioxide containing feed stream 10 is of high purity and methane is used as the reducing agent. The methane is supplied to the anode side 22 where it combusts with the oxygen transported through the electrolyte. As a consequence the product stream 12 is of high purity.

Figure 3:
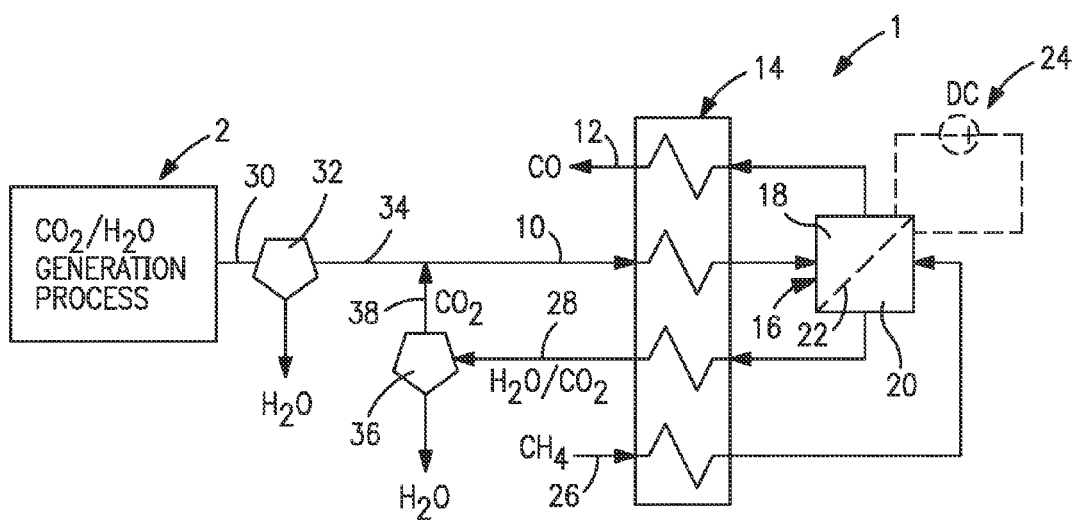
FIG. 3 is a schematic illustration of FIG. 2 integrated with carbon dioxide and water generation process.

With reference to FIG. 3, an integration of Apparatus 1 and a process plant 2 is shown. Process plant 2 generates a waste stream 30 that contains water and carbon dioxide, wherein the carbon dioxide is present in at least about 80 percent by volume on a dry basis, the remainder, for example, argon, oxygen, nitrogen. Process plant 2 can be, for example, plants used in connection with natural gas processing, the production of mineral products such as cement, lime and soda ash, the production of metals such as iron and steel, aluminum, zinc and lead, production of glass where oxyfuel combustion is used and the production of chemicals such as ethanol, ammonia, ethylene oxide and titanium dioxide. Furthermore, process plant 2 could be a power plant in which oxy-fuel combustion is conducted to produce a flue gas containing carbon dioxide and water.

Water is separated from the waste stream 30 by a drying system 32. In practice, drying system 32 would preferably be formed by a water cooled chiller to condense the water within waste stream 30 and a phase-separation pot to separate condensed water in waste stream 30 and thereby form a dried waste stream 34. Where methane is used as the reactant within the reactant stream 26, the reacted stream 28 will contain water and carbon dioxide. Optionally, the water can be separated from the reacted stream 28 within another drying system 36 to produce a recycle carbon dioxide stream 38 that can be combined with the dried waste stream 34 to produce the carbon dioxide containing feed stream 10. It is understood that drying system 32 and drying system 36 could be combined into a single system. The recycle of the carbon dioxide is also practical in the embodiment shown in FIG. 2. Furthermore, drying system 32 could be deleted or controlled so that the water is introduced into the electrically driven oxygen separation device 16 to produce hydrogen along with the carbon monoxide and therefore a synthesis gas product. The drying system 36, if present could be similarly controlled.

We claim:

1. An integrated apparatus for producing a carbon monoxide containing product comprising:
   a process plant comprising a waste stream containing carbon dioxide;
   a power supply configured to generate an electrical potential;
   an electrically driven oxygen separation device having a cathode side and an anode side connected to the power supply such that the electrical potential is applied to the cathode side and the anode side;
   a carbon dioxide containing feed stream produced from the waste stream and supplied to the cathode side;
   a carbon monoxide containing product stream generated by the reduction of the carbon dioxide feed stream to carbon monoxide through ionization of oxygen at the cathode side and transport of oxygen ions to the anode side of the electrically driven oxygen separation device;
   a reducing agent stream containing a reducing agent supplied to the anode side;
   a reacted stream formed from the reducing agent stream at the anode side;
   a heat exchanger in flow communication with the process plant,
   wherein the heat exchanger is connected to the cathode side to preheat the carbon dioxide stream produced from the waste stream and to return the carbon monoxide containing product stream from the cathode side to the heat exchanger and connected to the anode side to preheat the reducing agent stream containing the reducing agent and to return the reacted stream to the heat exchanger from the anode side wherein the preheat is achieved through indirect heat exchange with the reacted stream and the carbon monoxide containing product stream;
   wherein the partial pressure of the oxygen is lowered at the anode side and the transport of oxygen ions is driven in part through the consumption of the oxygen, thereby lowering the electrical potential and therefore, reducing electrical power required to be applied to the electrochemical oxygen separation device; and
   wherein heat is supplied to the electrochemical oxygen separation device for purposes of heating the electrochemical oxygen separation device to an operational temperature at which oxygen ion transport can occur.

2. The integrated apparatus of claim 1, wherein the carbon dioxide containing feed stream also contains water such that the product stream is a synthesis gas stream.

3. The integrated apparatus of claim 1, wherein the carbon dioxide containing feed stream is produced from the waste stream by provision of a drying system that is positioned between the process plant and the heat exchanger, the drying system configured to condense the water in the waste stream and separate the water after having been condensed, thereby to produce a stream containing about 80.0 percent carbon dioxide on a dry basis as the carbon dioxide containing feed stream.

4. The integrated apparatus of claim 3, wherein:
   the reducing agent is methane so that the reacted stream contains additional water and additional carbon dioxide;
   the additional water and additional carbon dioxide are separated in the drying system or an additional drying system; and
   the additional carbon dioxide is recycled back to the cathode side of the electrically driven oxygen separation device.

5. The integrated apparatus of claim 1 or claim 2 or claim 3 or claim 4, wherein the process plant is selected from the group of plants designed to expel carbon dioxide comprising natural gas processing, the production of mineral products such as cement, lime and soda ash, the production of metals such as iron and steel, aluminum, zinc and lead, production of glass where oxyfuel combustion is used and the production of chemicals such as ethanol, ammonia, ethylene oxide and titanium dioxide.

\* \* \* \* \*